US008136048B2

(12) United States Patent  
Torrey et al.

(10) Patent No.: US 8,136,048 B2
(45) Date of Patent: Mar. 13, 2012

(54) METHODS AND APPARATUS FOR PROVIDING MENU DATA TO A STORAGE AUTOMATION LIBRARY

(75) Inventors: William W. Torrey, Greeley, CO (US); Curtis C. Ballard, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2147 days.

(21) Appl. No.: 10/982,279

(22) Filed: Nov. 5, 2004

(65) Prior Publication Data

US 2005/0246662 A1    Nov. 3, 2005

Related U.S. Application Data

(60) Provisional application No. 60/568,069, filed on May 3, 2004.

(51) Int. Cl.
*G06F 3/048* (2006.01)

(52) U.S. Cl. .......................... 715/810; 715/841; 709/217

(58) Field of Classification Search .................. 715/808, 715/810, 828, 841, 850, 740, 733, 738; 709/217, 709/219, 203; 707/1, 10, 100, 104.1
See application file for complete search history.

(56) References Cited

U.S. PATENT DOCUMENTS

| | | | | |
|---|---|---|---|---|
| 5,157,783 A * | 10/1992 | Anderson et al. | ................. | 707/4 |
| 5,649,185 A * | 7/1997 | Antognini et al. | ................ | 707/9 |
| 5,944,839 A * | 8/1999 | Isenberg | ......................... | 714/26 |
| 6,131,100 A * | 10/2000 | Zellweger | .................. | 707/104.1 |
| 6,507,351 B1 * | 1/2003 | Bixler | ........................... | 715/810 |
| 7,181,204 B2 * | 2/2007 | Alfano et al. | ................. | 455/423 |
| 2002/0156834 A1 * | 10/2002 | Kitada et al. | ................. | 709/203 |
| 2005/0124332 A1 * | 6/2005 | Clark et al. | .................... | 455/419 |
| 2006/0014523 A1 * | 1/2006 | Reilly | ........................ | 455/412.1 |

OTHER PUBLICATIONS

Symantec, "How to lanuch a pcAnywhere 10.x host", Document ID: 2001021508461712, Feb. 15, 2001, 2 pages.
Symantec, "How to make a pcAnywhere 10.x connection", Document ID: 2001041212035112, Apr. 12, 2001, 5 pages.

* cited by examiner

*Primary Examiner* — Chat Do
*Assistant Examiner* — Phenuel Salomon

(57) ABSTRACT

In a method for displaying menus on a storage automation library, a user's input to the library is processed and, in response thereto, either 1) a menu derived from a local menu structure is displayed, or 2) a remote menu mode is activated. Between activation and deactivation of the remote menu mode, the library waits for a remote host to return remote menu data. A method by which a remote host retrieves the status of such an indicator, and apparatus for implementing these and other related methods, are also disclosed.

12 Claims, 4 Drawing Sheets

METHODS AND APPARATUS FOR PROVIDING MENU DATA TO A STORAGE AUTOMATION LIBRARY

CROSS-REFERENCE TO RELATED APPLICATION

This application claims priority, under 35 U.S.C. 119(e), to application Ser. No. 60/568,069 filed on May 3, 2004, which is hereby incorporated by reference.

BACKGROUND OF THE INVENTION

A storage automation library (e.g., a magnetic tape library or optical disk library) sometimes comprises a means for displaying menus (e.g., a monitor or LCD screen) and a means for receiving user input (e.g., a keyboard or touch screen). In this manner, a user may select from various displayed menu options to trigger the display of other menus, and/or to initiate a library task. The data on which the menus are based is typically stored in the library's firmware. This sometimes makes an upgrade of the menus difficult, and sometimes limits the content of the menus.

SUMMARY OF THE INVENTION

One aspect of the invention is embodied in a method for displaying menus on a storage automation library. In accordance with the method, a user's input to the library is processed and, in response thereto, either 1) a menu derived from a local menu structure is displayed, or 2) a remote menu mode is activated. Between activation and deactivation of the remote menu mode indicator, the library waits for a remote host to return remote menu data. One or more menus that are at least partly derived from the remote menu data are then displayed. While the remote menu mode is active, user input to the library is captured for processing by the remote host.

Another aspect of the invention is embodied in a method for providing menus to a storage automation library. Via a remote host, the storage automation library is periodically polled to extract therefrom a remote menu mode status and stored user input, if any. The remote host also provides menu data to the storage automation library, in response to a determination by the remote host that an extracted remote menu mode status is "active", and in response to the remote host's processing of the extracted user input, if any.

Other embodiments of the invention are also disclosed.

BRIEF DESCRIPTION OF THE DRAWINGS

Illustrative and presently preferred embodiments of the invention are illustrated in the drawings, in which.

DESCRIPTION OF THE PREFERRED EMBODIMENT

Figure 1:
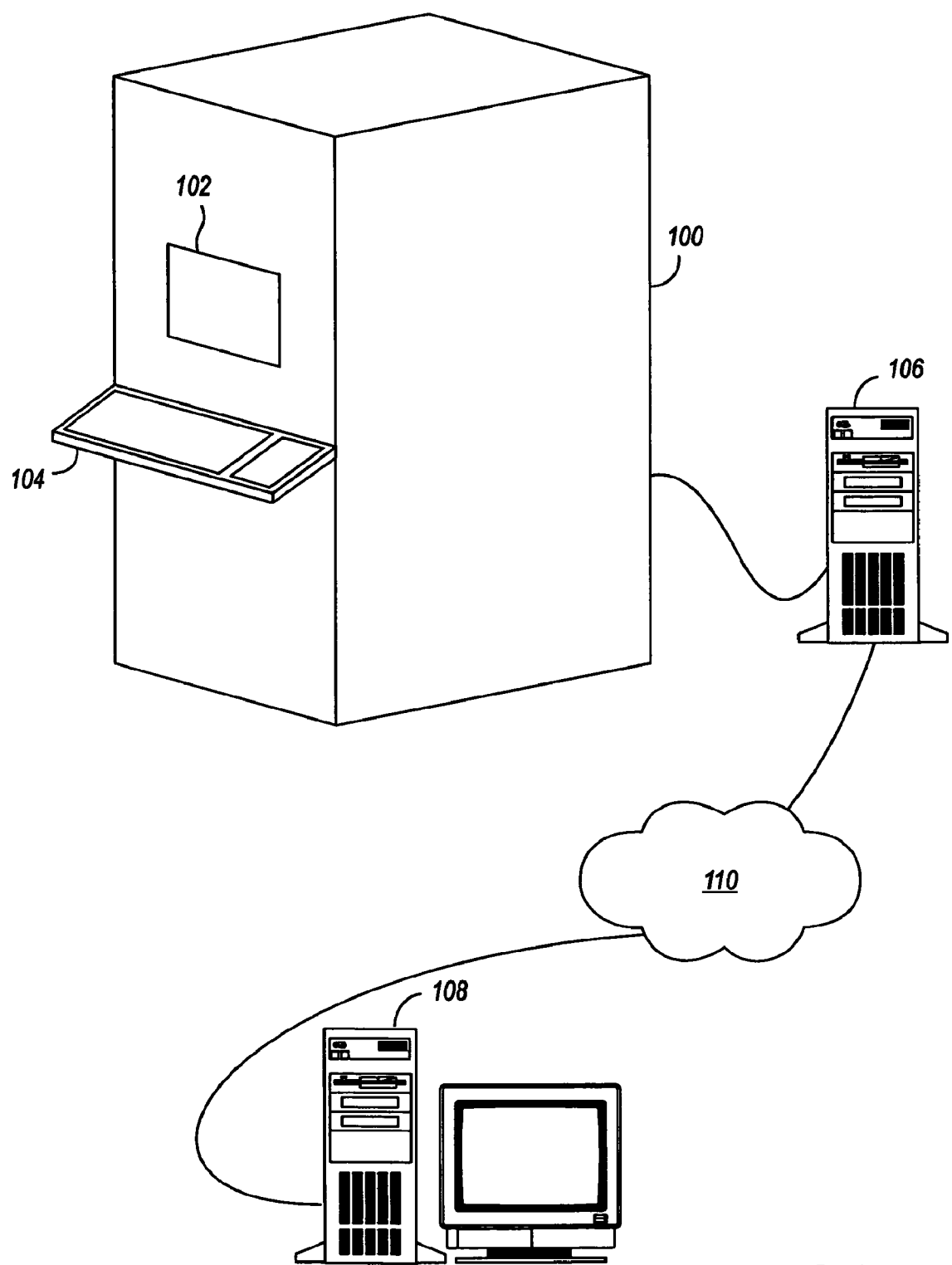
FIG. 1 illustrates an exemplary storage automation library that is coupled to a remote host.
Figure 2:
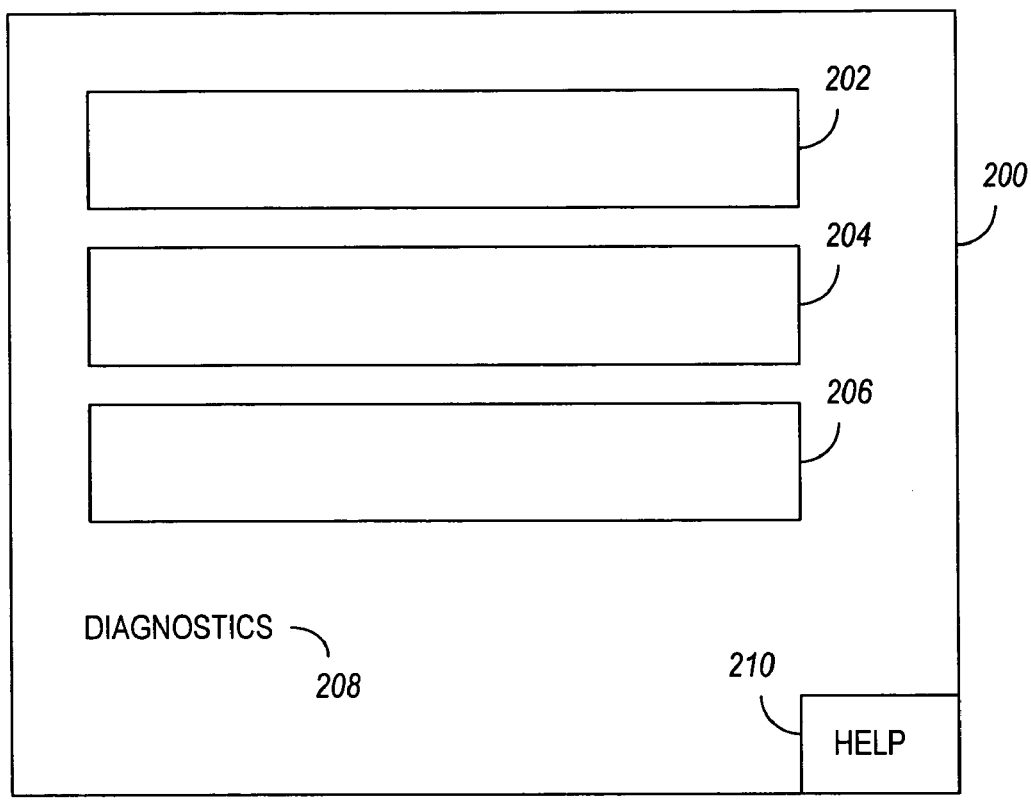
FIG. 2 illustrates an exemplary menu that might be displayed by a storage automation library.

FIG. 1 illustrates an exemplary storage automation library 100 coupled to a remote host 106. By way of example, the library 100 may be a magnetic tape library or optical disk library. As shown, the library 100 comprises a means 102 for displaying menus (e.g., a monitor or LCD screen) and a means 104 for receiving user input (e.g., a keyboard or touch screen). In this manner, a user may select from various displayed menu options to trigger the display of other menus, and/or to initiate a library task. An exemplary menu 200 comprising a plurality of menu options 202, 204, 206, 208, 210 is shown in FIG. 2.

The remote host 106 may be used to communicate with the library 100 from a remote site which, by way of example, could be as far away as a distant city, or as close as a desk in the same room. In one embodiment, the remote host 106 is a personal computer or computer server. Optionally, the remote host 106 may be networked with other computer systems 108 via a network 110. The network 110 might variously comprise a local area network (LAN), a wide area network (WAN), the Internet, or other types or combinations of networks. Network components (not shown) may also connect the remote host 106 to the library 100.

Figure 3:
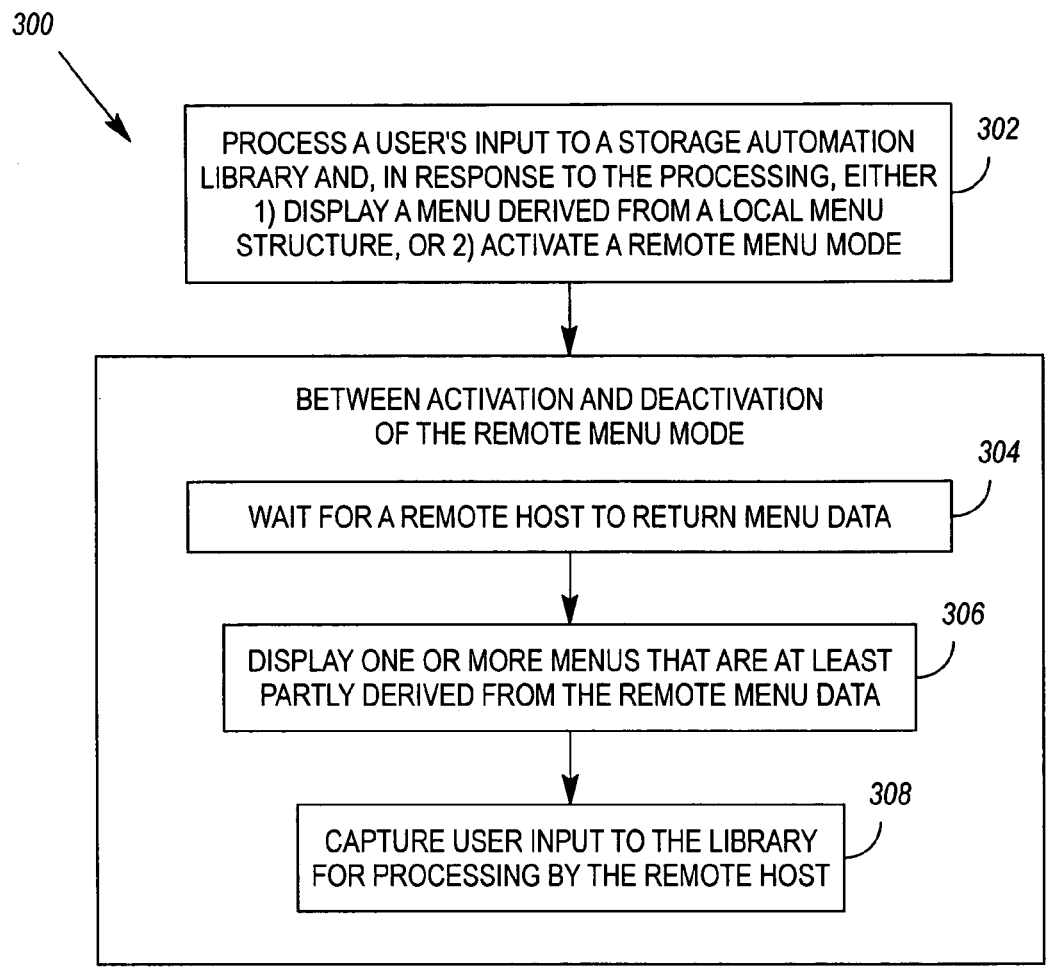
FIG. 3 illustrates an exemplary method for displaying menus on a storage automation library.

FIG. 3 illustrates a method 300 for displaying menus on a storage automation library 100 such as that which is shown in FIG. 1. The method 300 comprises processing 302 a user's input to the library 100 (e.g., keystrokes) and, in response to the processing, either 1) displaying a menu derived from a local menu structure, or 2) activating a remote menu mode. Between activation and deactivation of the remote menu mode, the method 300 comprises waiting 304 for a remote host to return remote menu data, displaying 306 one or more menus that are at least partly derived from the remote menu data, and capturing 308 user input to the library for processing by the remote host.

In one embodiment of the method 300, the remote menu mode may be activated by means of the library 100 setting a remote menu mode indicator to "active". The remote host 106 may then poll the library 100 to determine the status of the remote menu mode indicator and, upon determining that the remote menu mode indicator is "active", may begin providing remote menu data to the library 100. In this embodiment, the library 100 may also store its captured user input for retrieval by the remote host 106.

In another embodiment of the method 300, the remote menu mode may be activated by means of the library 100 sending an event (e.g., a Simple Network Management Protocol (SNMP) event) to the remote host 106. In this embodiment, the library 100 may still store captured user input for retrieval by the remote host 106. Alternately, or additionally, the library 100 may send the remote host 106 some or all of the captured user input via SNMP events.

In some cases, the local menu structure that is accessed by the method 300 may be limited in its size; or, for example, the local menu structure may not describe or provide access to updated features of the library 100. By way of example, these and other limitations of the local menu structure may result from the local menu structure being stored in firmware that is limited in size or is difficult to upgrade. The method 300 may therefore be used to complement, or even replace, the local menu structure.

As previously suggested, remote host 106 may be implemented as a personal computer, which is likely to have far greater processing capabilities than a storage automation library 100 and, thus, can store and serve a greater number of menus to the library 100. Furthermore, menus stored on a personal computer may be more easily upgradeable, as the menus are likely to be embodied in software rather than firmware. In addition, if the selection of a menu option triggers the execution of a diagnostic test or other computational task, a personal computer is likely to have greater processing capabilities for carrying out the task, thereby freeing the resources of the library 100 for the library's core functions of storing and retrieving data.

Figure 4:
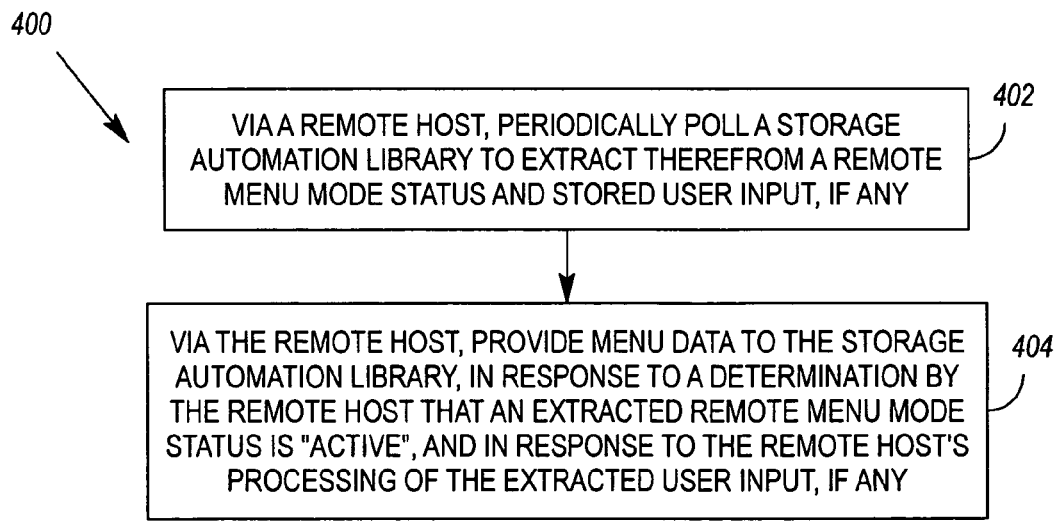
FIG. 4 illustrates an exemplary method for providing menu data to a storage automation library.

Turning now to the perspective of the remote host 106, FIG. 4 illustrates a method 400 for providing menu data to the library 100. The method 400 begins with a remote host's periodic polling 402 of a library 100 to extract therefrom a remote menu mode status and stored user input (e.g., keystrokes), if any. Alternately, the remote host 106 may receive an SNMP event from the library 100. Then, in response to the remote host's determination that the remote menu mode status is "active", and in response to the remote host's processing of the extracted (or received) user input, if any, the remote host 106 provides menu data to the library 100.

Once the library's remote menu mode has been activated, the library's menus (e.g., menu 200, FIG. 2) may be derived solely from the menu data provided by the remote host 106. Alternately, dynamic portions of the library's menus (e.g., substantive information 202-208) may be derived from the remote menu data, and static portions of the library's menus (e.g., help buttons 210, logos, general navigation features) may be derived from the library's local menu structure.

In the case where activation of the remote menu mode causes the library's menus to be derived solely from the remote host 106, the remote menu mode may be exited by means of a user-selectable remote menu exit function that is received as part of the remote menu data and displayed by the library 100. When a library user selects the remote menu exit function, the user's selection may be captured and stored for subsequent retrieval by the remote host 106. Upon retrieving this selection, the remote host 106 may issue a command to reset the library's remote menu mode status to "inactive", and the library 100 may return to displaying menus derived from its local menu structure. Alternately, the menu data provided by the remote host 106 may comprise code that links a user's selection of the remote menu exit function to deactivation of the remote menu mode by the library 100, without further action from the remote host 106.

In the case where activation of the remote menu mode allows portions of the library's menus to be derived from the library's local menu structure, a remote menu exit function may be derived from the library's local menu structure. Alternately, a remote menu exit function may be triggered by means of a dedicated button or other means of the library 100.

Note that a remote menu exit function may be specifically labeled as such, or may be automatically triggered by the selection of a given menu item (e.g., menu item 208, FIG. 2).

Figure 5:
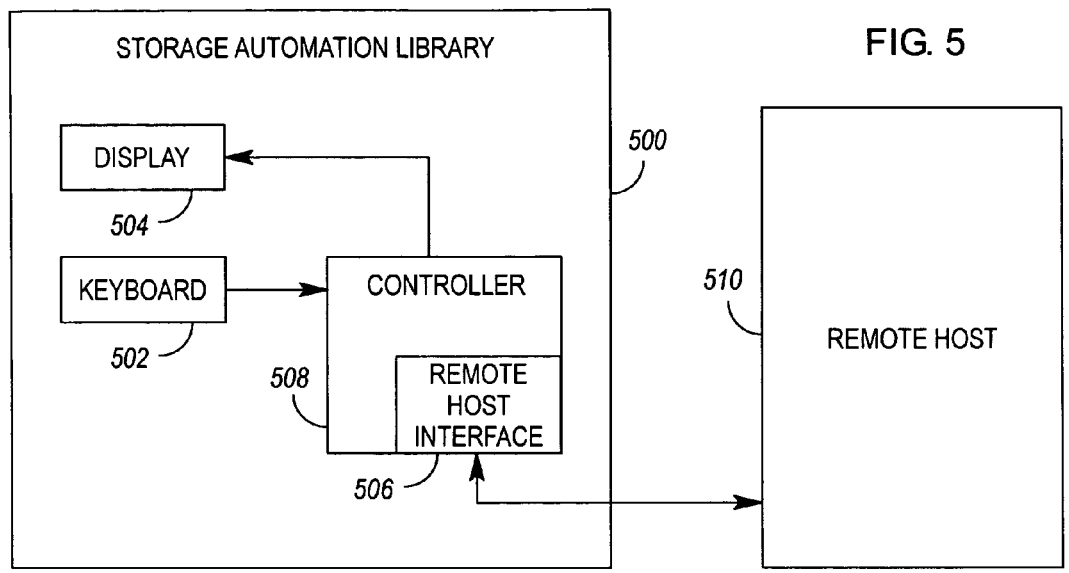
FIGS. 5 & 6 are block diagrams illustrating various exemplary components of a storage automation library and remote host.

FIG. 5 provides a block diagram illustrating various exemplary components 502, 504, 506, 508 of a storage automation library 500 that might implement the method 300 shown in FIG. 3. The library 500 comprises user input means (e.g., a keyboard 502, mouse, and/or touch screen), user output means (e.g., a display screen such as a monitor, LCD screen 504, or touch screen), a remote host interface 506, and control means 508. The control means 508 processes data received via the user input means 502 and, in response thereto, either 1) outputs to the user output means 504 a menu derived from the local menu structure, or 2) activates a remote menu mode (e.g., by locally setting a remote menu mode indicator to "active", or by sending an SNMP event to a remote host 510). The control means 508 then waits for the remote host 510 to return remote menu data via the remote host interface 506, outputs to the user output means 504 one or more menus derived from the remote menu data, and captures user input to the library 500 for processing by the remote host 510.

Figure 6:
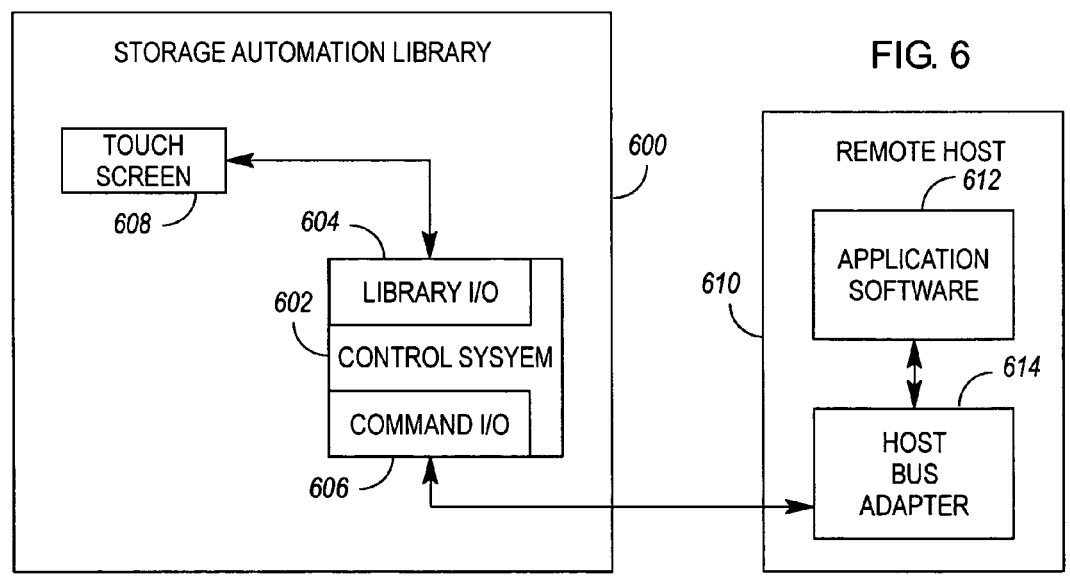

FIG. 6 provides another block diagram of a storage automation library 600. In FIG. 6, the library 600 is shown to have a control system 602. The control system 602 comprises a library I/O interface 604 and a command I/O interface 606. The control system 602 further comprises various portions of program code that, by way of example, may be embodied in firmware, software, and/or other types of code that may be stored in any one or more of: random access memory (RAM), read-only memory (ROM), electrically erasable programmable ROM (EEPROM), a hard drive, or a removable drive. A first portion of the code provides a local menu structure, from which some or all of the menus of the library 600 may be derived. Another portion of the code processes user input received through the library I/O interface 604 (e.g., from touch screen 608) and, in response thereto, either 1) outputs, via the library I/O interface 604, a menu derived from the local menu structure, or 2) locally sets a remote menu mode indicator to "active". Between activation and deactivation of the remote menu mode, additional code receives remote menu data via the command I/O interface 606, and outputs via the library I/O interface 604, one or more menus derived from the remote menu data. While the remote menu mode is active, yet other code stores user input received via the library I/O interface 604. The user input is stored for retrieval through the command I/O interface 606 by, for example, the remote host 610.

The control system's code may further comprise code to process library configuration commands that are received through the command I/O interface 606. Alternately, or additionally, the control system may comprise code to install firmware updates that are received through the command I/O interface 606.

In one embodiment of the library 600, the command I/O interface 606 is a SCSI (Small Computer Systems Interface) interface. In this embodiment, the remote menu mode indicator may be locally activated via the library 600, or remotely activated by means of the remote host 610 issuing a SCSI Write_Buffer command. To deactivate the library's remote menu mode, the remote host 610 may issue a SCSI Write_Buffer command to set the remote menu mode indicator to "inactive". Alternately, or additionally, certain user input received through the library I/O interface 604 may cause the control system 602 to set the remote menu mode indicator to "inactive".

FIG. 6 also illustrates components of a remote host 610. The remote host 610 may comprise computer readable storage media (e.g., a hard drive) having program code (e.g., application software 612) stored thereon. The program code comprises code to periodically poll the command I/O interface 606 of the library 600 to extract therefrom the remote menu mode status and stored user input, if any. Alternately, the program code may monitor an input port for events (e.g., SNMP events) received from the library 600. In response to a determination that an extracted remote menu mode status is "active", and in response to the extracted user input, if any, the code may provide menu data to the library's command I/O interface 606. By way of example, the menu data may comprise extended help information, explanations of upgraded library features, diagnostic results, configuration commands, or firmware updates. As a result, the remote host's program code may further comprise code that is responsive to the extracted user input to: execute diagnostic tests for the library 600, provide configuration commands to the library 600, or provide firmware updates to the library 600.

Code of the remote host 610 may communicate with the command I/O interface 606 (e.g., poll it and/or provide menu data to it) in a number of ways. For example, the code could communicate with the command I/O interface 606 via a SCSI connection, a serial connection, an IP connection, or some combination thereof. In one embodiment, the code communicates with the command I/O interface 606 via TCP/IP over a packetized SCSI protocol via a host bus adapter 614. In such an implementation, the remote host's code may poll the command I/O interface 606 by issuing SCSI Read_Buffer commands. The code may then cause the library 600 to reset its remote menu mode status to "inactive" by issuing a SCSI Write_Buffer command.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. Remote host apparatus for providing menu data to a storage automation library, comprising:
    computer readable storage media; and
    program code stored on the computer readable storage media, comprising:
    code to periodically poll a command I/O interface of the storage automation library to extract therefrom a remote menu mode status and stored user input; and
    code to provide menu data to the command I/O interface, in response to a determination that an extracted remote menu mode status is "active", wherein the remote menu mode is activated when a local menu structure in the storage automation library does not provide access to updated features for the storage automation library.

2. The apparatus of claim 1, wherein the program code further comprises code, responsive to the extracted user input, to cause the storage automation library to reset the remote menu mode status to "inactive".

3. The apparatus of claim 1, wherein the code to poll the command I/O interface issues SCSI Read_Buffer commands, and wherein the code to provide menu data to the command I/O interface issues SCSI Write_Buffer commands.

4. The apparatus of claim 1, wherein said code undertakes communications with the command I/O interface via TCP/IP over a packetized SCSI protocol.

5. The apparatus of claim 1, wherein the extracted user input comprises stored keystrokes.

6. The apparatus of claim 1, wherein the menu data comprises extended help information.

7. The apparatus of claim 1, wherein the program code further comprises code, responsive to the extracted user input, to execute diagnostic tests for the storage automation library.

8. The apparatus of claim 1, wherein the program code further comprises code, responsive to the extracted user input, to provide configuration commands to the storage automation library.

9. The apparatus of claim 1, wherein the program code further comprises code, responsive to the extracted user input, to provide firmware updates to the storage automation library.

10. A method for providing menu data to a storage automation library, comprising:
    via a remote host, periodically polling the storage automation library to extract therefrom a remote menu mode status and stored user input, if any; and
    via the remote host, providing menu data to the storage automation library, in response to a determination by the remote host that an extracted remote menu mode status is "active", and in response to the remote host's processing of the extracted user input, if any, wherein the remote menu mode is activated when a local menu structure in the storage automation library does not provide access to updated features for the storage automation library.

11. The method of claim 10, wherein at least some of the menu data provided to the storage automation library defines a user-selectable remote menu exit function for display by the storage automation library.

12. The method of claim 11, wherein the menu data comprises code that links selection of the remote menu exit function to deactivation of the remote menu mode by the storage automation library, without further action from the remote host apparatus.

* * * * *